(12) United States Patent
Evans et al.

(10) Patent No.: US 6,515,880 B1
(45) Date of Patent: Feb. 4, 2003

(54) SOFT-START CONTROL FOR DC/DC SWITCHING REGULATORS

(75) Inventors: David W. Evans, Plano, TX (US); J. Patrick Kawamura, Richardson, TX (US); James L. Krug, Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/090,175

(22) Filed: Oct. 19, 2001

(51) Int. Cl.[7] .............................................. H02M 7/10
(52) U.S. Cl. ................................................ 363/49
(58) Field of Search ..................... 363/49, 50; 323/282, 323/283, 285

(56) References Cited

U.S. PATENT DOCUMENTS

| 3,579,077 | A | * | 5/1971 | Cameron ........................ 321/2 |
| 4,015,609 | A | * | 4/1977 | Mensink et al. ...... 128/419 PG |
| 4,180,852 | A | | 12/1979 | Koizumii et al. |
| 4,625,271 | A | | 11/1986 | Chetty et al. |
| 5,248,904 | A | | 9/1993 | Miyazaki et al. |
| 5,798,635 | A | | 8/1998 | Hwang et al. |
| 5,856,739 | A | * | 1/1999 | Trica .......................... 323/222 |
| 5,962,989 | A | | 10/1999 | Baker |
| 6,100,677 | A | | 8/2000 | Farrenkopf |

* cited by examiner

*Primary Examiner*—Matthew Nguyen
(74) *Attorney, Agent, or Firm*—Ronald O. Neerings; Wade J. Brady, III; Frederick J. Telecky, Jr.

(57) ABSTRACT

Startup operation of a DC/DC switching regulator is controlled by providing a first signal (MAXDC) whose waveform has a duty cycle that varies over time, providing a second signal (620, 622) indicative of a load condition of the regulator, and combining the first and second signals to produce a third signal (312, 311). The third signal is used to control a power switch (231, 324) of the regulator.

30 Claims, 6 Drawing Sheets

SOFT-START CONTROL FOR DC/DC SWITCHING REGULATORS

FIELD OF THE INVENTION

The invention relates generally to DC/DC switching regulators and, more particularly, to startup operation of DC/DC switching regulators.

BACKGROUND OF THE INVENTION

DC/DC switching regulators are an important part of many power management systems. This is particularly true of power management systems in wireless communication devices, where circuit efficiency and power-packing density are important concerns. DC/DC switching regulators are closed loop systems. Voltage mode control is a popular conventional scheme for controlling DC/DC switching regulators. In conventional voltage mode control operation, an output voltage sampled from (e.g., a resistor divider) within the regulator load is compared to a voltage ramp signal. The result of this comparison is used to modulate the duty cycle of the regulator's power switches.

The voltage ramp signal is typically generated from a phase locked loop (PLL) circuit. The PLL attempts to "lock" in a particular reference clock frequency, and generates clock signals having frequencies at some multiple of the reference frequency. This synthesized clock signal becomes the switching clock of the DC/DC switching regulator.

One problem with conventional voltage mode control schemes is starting capability. At startup, the sampled output voltage is not within the range of normal operation specified by the voltage ramp signal. This results in the regulator power switches trying to turn on constantly, causing a large current flow which disadvantageously results in both an increased risk of device damage and decreased circuit performance.

Conventional solutions to the above-described startup problem typically use some form of soft-start charging capacitor and current source in conjunction with a bandgap referenced capacitor for selecting between a soft-start mode of operation and the normal mode of operation. If the charging capacitor is provided as an external component, then the cost and space requirements of the regulator are disadvantageously increased. If the charging capacitor is provided as an integrated component, then the die area is disadvantageously increased.

It is therefore desirable to avoid the aforementioned excessive current flow during startup of a voltage mode control DC/DC switching regulator, without requiring a charging capacitor.

The invention provides a signal that limits the duty cycle of the power regulator switches at startup. The duty cycle limit is gradually increased over time by operation of the signal, thereby advantageously avoiding excessive current flow during the period of time when the sampled output voltage has not reached the range of operation specified by the voltage ramp signal.

DETAILED DESCRIPTION

Figure 1:
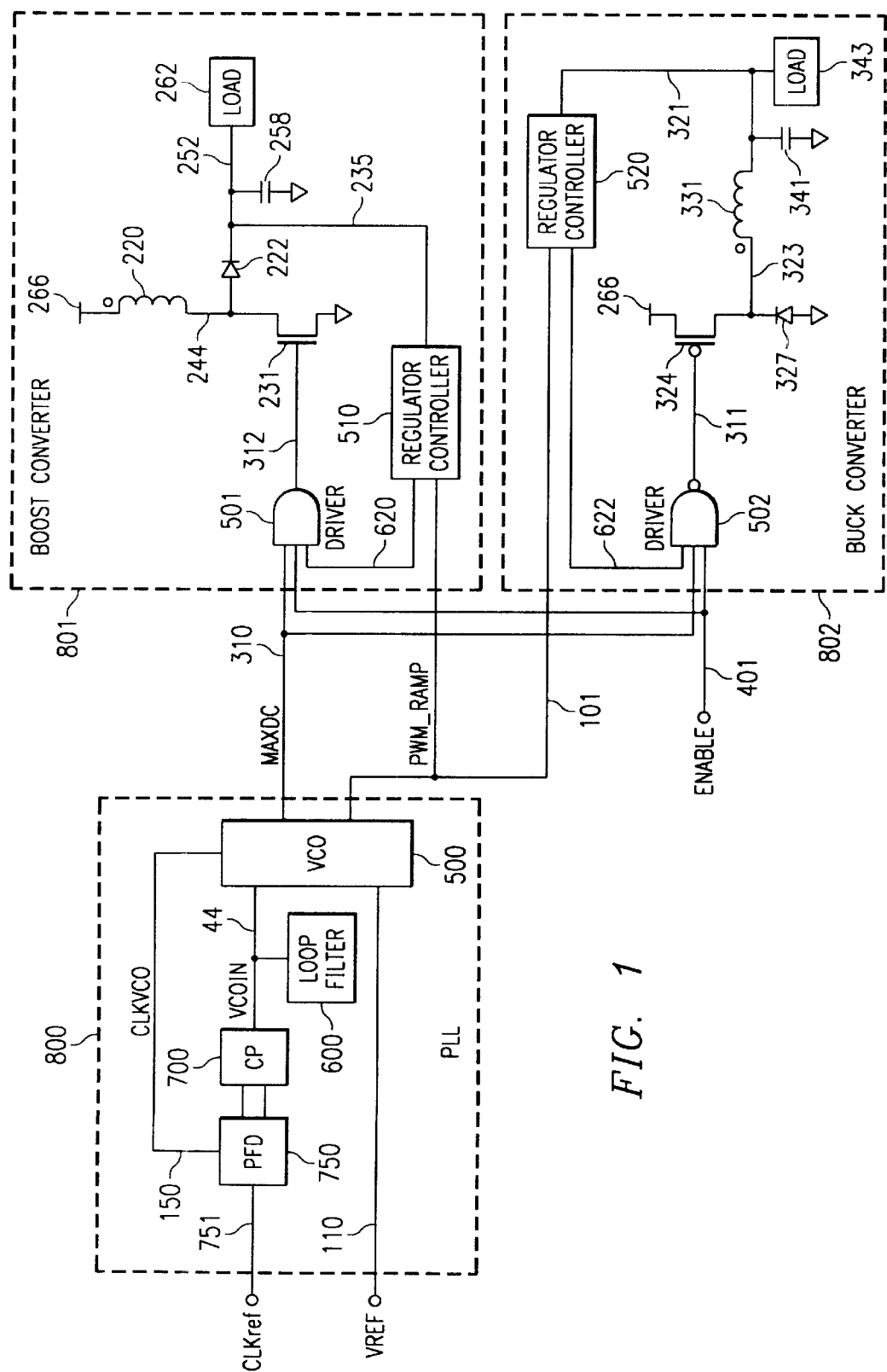
FIG. 1 diagrammatically illustrates pertinent portions of exemplary embodiments of a DC/DC switching regulator according to the invention.

FIG. 1 diagrammatically illustrates pertinent portions of exemplary embodiments of a DC/DC switching regulator according to the invention. The regulator of FIG. 1 includes a PLL circuit 800 coupled to a boost mode switching regulator circuit 801 and a buck mode switching regulator circuit 802. The PLL 800 includes an input 751 for receiving a clock reference signal CLKref (e.g. an output of a crystal oscillator at 32.768 KHz) and a further input 110 for receiving a voltage reference signal VREF. The PLL 800 includes a phase frequency detector (PFD) 750 coupled to the input 751 and also coupled to a clock signal CLKVCO produced at 150 by a voltage controlled oscillator (VCO) 500. The outputs of the PFD 750 are coupled to a charge pump (CP) 700 whose output 44 provides a VCO tune voltage VCOIN to the VCO 500. A loop filter 600 is coupled to the output 44 of CP 700. The VCO 500 is also coupled to the input 110. The VCO 500 produces a voltage ramp signal PWM_RAMP at 101, which is applied to both the buck and boost mode switching regulator circuits 802 and 801.

The above-described structure of the PLL 800 is well known in the art, as is the corresponding operation of that structure.

The voltage ramp signal 101 produced by the PLL 800 is coupled to respective regulator controllers 510 and 520 in the boost and buck mode switching regulators 801 and 802. The regulator controllers 510 and 520 are well known conventional structures that perform the conventional operation of comparing the voltage ramp signal 101 with a sampled output voltage (235 or 321) from a corresponding load (262 or 343), which comparison results in activation or deactivation of pass device enabling signals 620 and 622. These enabling signals 620 and 622 are operable, via logic gate drivers 501 (AND) and 502 (NAND), to drive the gate inputs 312 and 311 of respective NMOS and PMOS pass devices 231 and 324. These pass devices 231 and 324 control currents flowing from power rail 266 through respective inductors 220 and 331, into corresponding loads 262 and 343. The logic gate drivers at 501 and 502 are also coupled to an input 401 which receives an enable signal that is activated to start the DC/DC switching regulator. The above-described structures of the boost and buck mode switching regulators 801 and 802 are well known in the art, as are their corresponding operations. The connection of diode 327 between node 323 and ground in the regulator 802, and the connection of diode 222 between node 244 and node 252 in regulator 801 are also well known in the art, as are the use and placement of the capacitors 258 and 341.

According to the invention, the VCO 500 of the PLL circuit 800 produces at 310 a signal MAXDC which is applied to each of logic drivers 501 and 502, and which is operable to limit the duty cycle of the pass devices 231 and 324 during the time period beginning immediately at startup when the sampled output voltages at 235 and 321 are not within the range of normal operation specified by the voltage ramp signal PWM_RAMP. The MAXDC signal operates to gradually increase the duty cycle limit of the devices 244 and 324 over time until, for example, the duty cycle limit reaches the value that it would have assumed immediately upon startup in conventional DC/DC switching regulators. The logic drivers 501 and 502 combine MAXDC with signals 620 and 622 to produce the gate input signals at 312 and 311.

Figure 2:
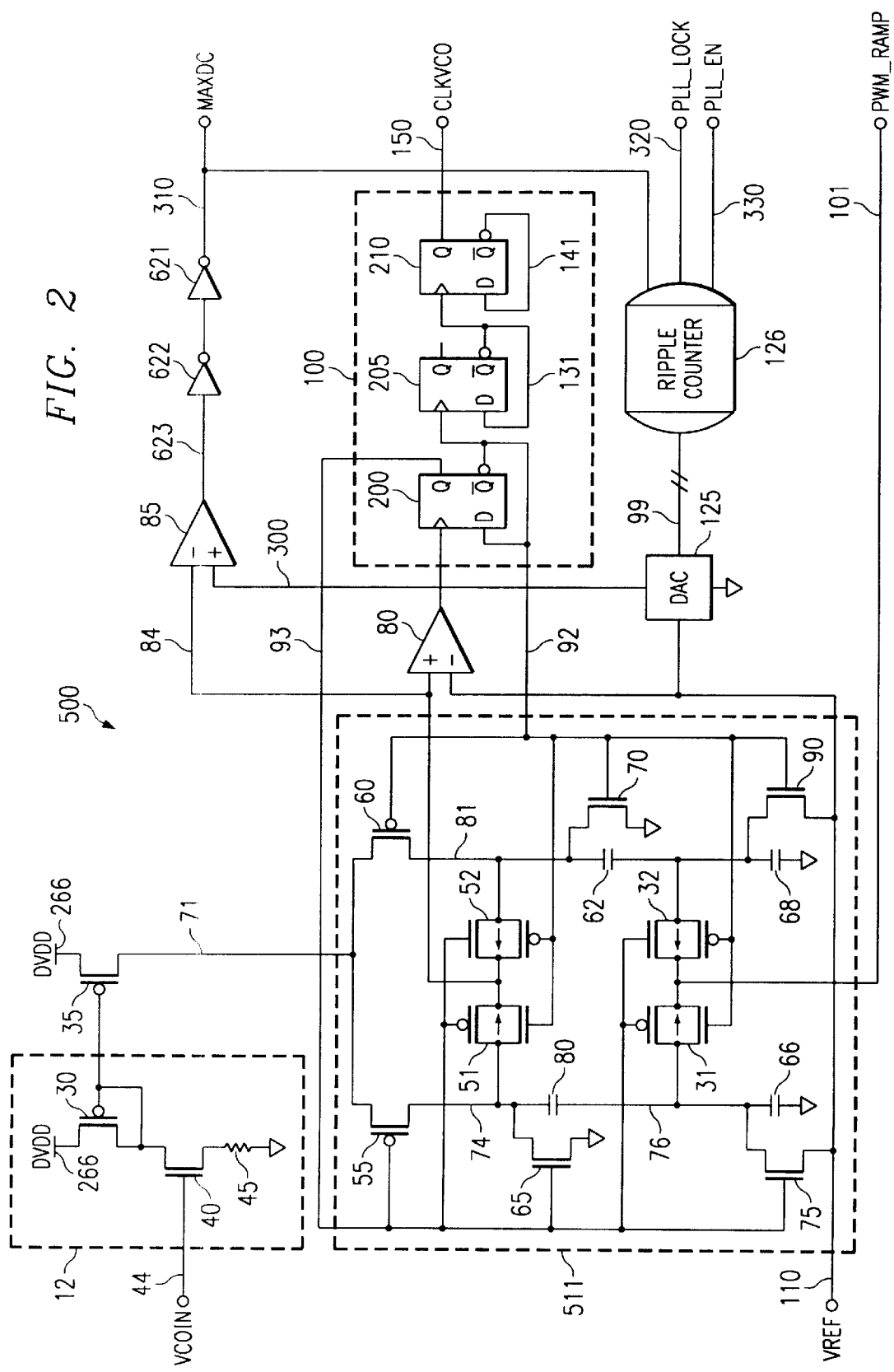
FIG. 2 diagrammatically illustrates exemplary embodiments of the voltage controlled oscillator of FIG. 1.

FIG. 2 diagrammatically illustrates exemplary embodiments of the VCO 500 of the PLL circuit 800 of FIG. 1. The VCO 500 of FIG. 2 includes a current source circuit 12 driven by the tune voltage VCOIN at 44. The current source circuit 12 includes a PMOS transistor 30, an NMOS transistor 40 and a resistor 45 connected in series between the power supply rail 266 and ground. The gate of the PMOS transistor 30 is connected to the common node of the PMOS transistor 30 and the NMOS transistor 40. The gate of the PMOS transistor 30 is also connected to the gate of a further PMOS transistor 35, which is coupled between the power supply rail 266 and an input 71 of a ramp generator 511. The ramp generator 511 also receives as input the voltage reference signal VREF at 110.

The ramp generator 511 includes a conventional arrangement of PMOS transistors 55 and 60, NMOS transistors 65, 70, 75 and 90, parallel pass gate combinations 31, 32, 51 and 52, and capacitors 62, 66, 68 and 80. The gates of transistors 55, 65 and 75, and one control gate of each of the parallel pass gate combinations 31, 32, 51 and 52 are driven by a ramp period control signal 93. The gates of transistors 60, 70 and 90, and the other control gate of each of the parallel pass gate combinations 31, 32, 51 and 52 are driven by a further ramp period control signal 92. The ramp period control signals 92 and 93 are the respective Q' and Q outputs of a D flip-flop 200 of a frequency divider 100. The Q' output of flip-flop 200 is fed back to the D input of flip-flop 200, and is also connected to the clock input of a further D flip-flop 205 whose Q' output is fed back to its D input at 131. The Q' output of flip-flop 205 is also connected to the clock input of a further D flip-flop 210, whose Q' output is fed back to its D input at 141. The Q output of flip-flop 210 provides the CLKVCO signal at 150 (see also FIG. 1). The clock input of flip-flop 200 is driven by the output of a comparator 80 whose inverting input is driven by the voltage reference signal VREF and whose non-inverting input is connected to the common node of the parallel pass gate combinations at 51 and 52.

The above-described arrangement of the current source circuit 12, the transistor 35, the ramp generator 511, the comparator 80 and the frequency divider 100 is well known in the art, and is conventionally operable to produce the voltage ramp signal PWM_RAMP at the common node of the parallel pass gate combinations 31 and 32. This arrangement is also conventionally operable to provide a ramp signal 84 at the common node of the parallel pass gate combinations 51 and 52. This ramp signal 84 corresponds to the ramp signal PWM_RAMP, but is a rail-to-rail signal, whereas the amplitude of the signal PWM_RAMP is determined by the size of the charging capacitors at 66 and 68.

The ramp signal 84 also drives the inverting input of a comparator 85 whose non-inverting input is driven by the output 300 of a digital-to-analog converter (DAC) 125. The output 623 of the comparator 85 is buffered at 621 and 622 to produce the MAXDC signal at 310. This MAXDC signal is fed back to clock a ripple counter 126 whose count output provides the digital input 99 to the DAC 125. The ripple counter 126 includes a pair of enable inputs 320 and 330 which ensure that the ripple counter does not begin counting until a stable PLL clock has been locked (signified by the signal PLL_LOCK from PLL 800) and a valid PLL turn-on event has occurred (signified by the signal PLL_EN). In some embodiments, the signal PLL_LOCK also serves as the enable signal at 401 in FIG. 1.

The MAXDC signal operates at a frequency controlled by the VCO tune voltage VCOIN 44. The duty cycle of the MAXDC signal is determined by the voltage at which the ramp signal 84 intersects the DAC output voltage 300. As long as the ramp voltage at 84 is below the voltage at 300, the MAXDC signal is high. However, when the ramp voltage 84 reaches the voltage at 300, the MAXDC signal goes low. MAXDC remains low until the ramp voltage 84 reaches VREF, at which time the ramp comparator 80 makes a positive transition, thereby toggling the ramp period control signals 92 and 93, which resets the ramp voltage 84 (and the ramp voltage 101) back to the ground potential.

Thus, by setting the DAC output voltage 300 to a desired fraction of the reference voltage VREF, the duty cycle of the signal MAXDC can be set as desired. For example, if the output voltage 300 is set at 50% of VREF, then MAXDC will be high until the ramp voltage at 84 reaches 50% of VREF, at which time MAXDC will go low, and will remain so until the ramp voltage 84 reaches VREF, at which time the ramp voltage 84 will go to ground potential again, thus taking MAXDC high again, thereby producing a 50% duty cycle for MAXDC. Similarly, a 30% duty cycle can be achieved by setting the output voltage 300 to 30% of VREF, etc.

Therefore, by suitably setting and varying the output voltage 300 of the DAC 125, the duty cycle of MAXDC can be varied from a lower value to a higher value during startup. Accordingly, the MAXDC signal can be used in conjunction with logic drivers 501 and 502 of FIG. 1 to limit the duty cycle of the devices 231 and 324 of FIG. 1 during startup operations. The duty cycle of MAXDC can be gradually increased over time, so that the duty cycle limit of the devices 231 and 324 can eventually reach a conventional level, but only after enough time has elapsed for the sampled output voltages at 235 and 321 to come within the voltage range specified by the ramp voltage signal PWM_RAMP. Without the MAXDC signal, the regulator controllers 510 and 520 would try to turn the pass devices on constantly during initial startup, as in the conventional regulators described above.

The ripple counter 126 of FIG. 2 can be designed to provide the desired duty cycle progression for the signal MAXDC. In one exemplary embodiment, the ripple counter 126 produces a sequence of digital values at 99 which cause the DAC output 300 to assume a sequence of voltage levels beginning with 35% of VREF, then 45% of VREF, then 55% of VREF and then 65% of VREF. The 65% of VREF corresponds to an exemplary duty cycle limit to which the devices 231 and 324 are subject immediately upon startup in conventional DC/DC switching regulators. Thus, by the time the ripple counter reaches the digital value corresponding to 65% of VREF, the duty cycle of the MAXDC signal as seen by the buck and boost mode switching regulators 801 and 802 is 65%, which permits the switching regulators 801 and 802 to operate up to a common conventional "maximum duty cycle" limit, while still allowing a full range of operation.

Figure 3:
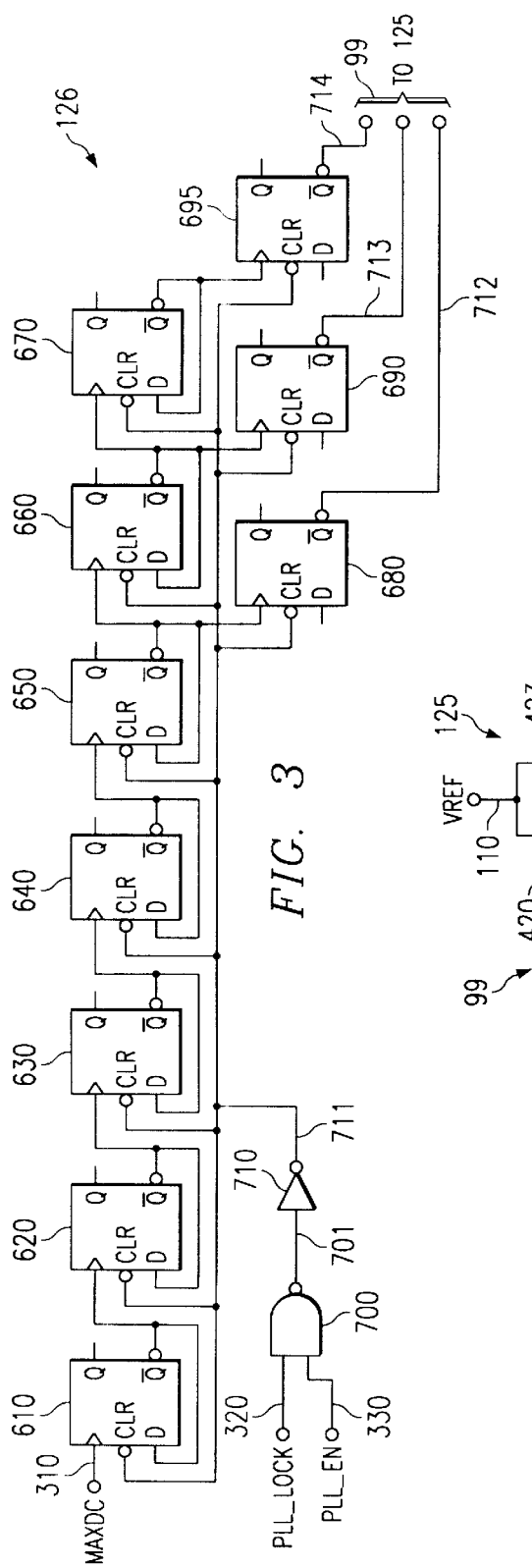
FIG. 3 diagrammatically illustrates exemplary embodiments of the ripple counter of FIG. 2.

FIG. 3 diagrammatically illustrates an exemplary embodiment of the ripple counter 126 of FIG. 2. The ripple counter of FIG. 3 includes D flip-flops 610, 620, 630, 640, 650, 660 and 670, each of which has its Q' output fed back to its D input. The clock input of flip-flop 610 is driven by MAXDC, and the clock inputs of flip-flops 620, 630, 640, 650, 660 and 670 are respectively driven by the Q' outputs of flip-flops 610, 620, 630, 640, 650 and 660. The Q' outputs of flip-flops 650, 660 and 670 respectively drive the clock inputs of D flip-flops 680, 690 and 695. The Q' outputs of flip-flops 680, 690 and 695, whose respective D inputs can be pulled up to a logic 1 (not explicitly shown), provide at 712, 713 and 714 the constituent digital signals of the digital input 99 of the DAC 125 (see also FIG. 2). The enable signals 320 and 330 are input to a NAND gate 700 whose output 701 is inverted at 710 to produce a signal 711 that is connected to the clear inputs of each of the aforementioned D flip-flops. The arrangement of FIG. 3 can produce the aforementioned exemplary sequence of 35%, 45%, 55% and 65% of VREF.

Figure 4:
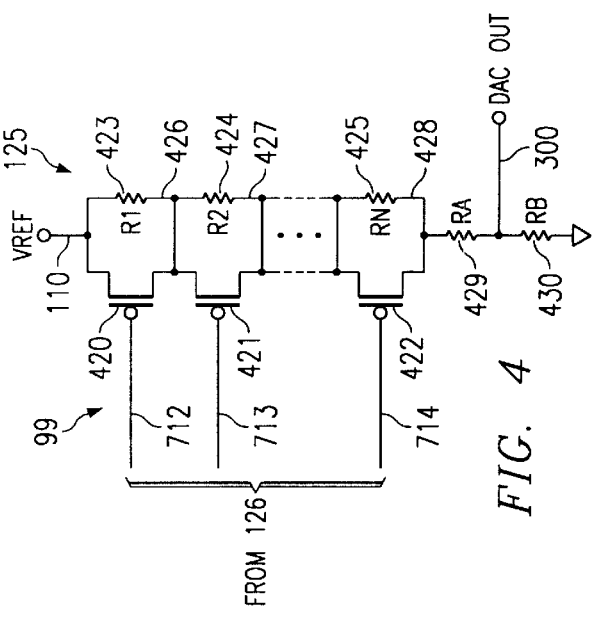
FIG. 4 diagrammatically illustrates exemplary embodiments of the digital-to-analog converter of FIG. 2.

FIG. 4 diagrammatically illustrates an exemplary embodiment of the DAC 125 of FIG. 2. The example of FIG. 4 contemplates receiving bits 0–N from the ripple counter, for example the three bits 712, 713 and 714 produced by the ripple counter example of FIG. 3. The DAC 125 of FIG. 4 includes a plurality of series-connected resistors R1 (423), R2 (424), . . . RN (425), all connected in series with a resistor divider RA (429) and RB (430) from which the DAC output 300 is taken. PMOS transistors 420, 421, . . . 422 are respectively connected in parallel with the resistors 423, 424, . . . 425. Thus, activation of any transistor at 420, 421 or 422 will remove the corresponding parallel-connected resistor 423, 424 or 425 from the series resistance chain between VREF and the DAC output 300. So, as each bit 712, 713 or 714 turns on its corresponding transistor 420, 421 or 422, the corresponding resistor 423, 424 or 425 is removed from the resistance chain, thereby raising the voltage at 300. When all resistors are in the resistance chain, the voltage at 300 is lowest, and when all of the resistors at 423, 424 and 425 are removed from the resistance chain, the voltage at 300 is highest. Accordingly, the resistance values and ripple counter outputs can be readily designed appropriately to produce the desired sequence of voltages at 300, for example 35%, 45%, 55% and 65% of VREF.

Figure 5:
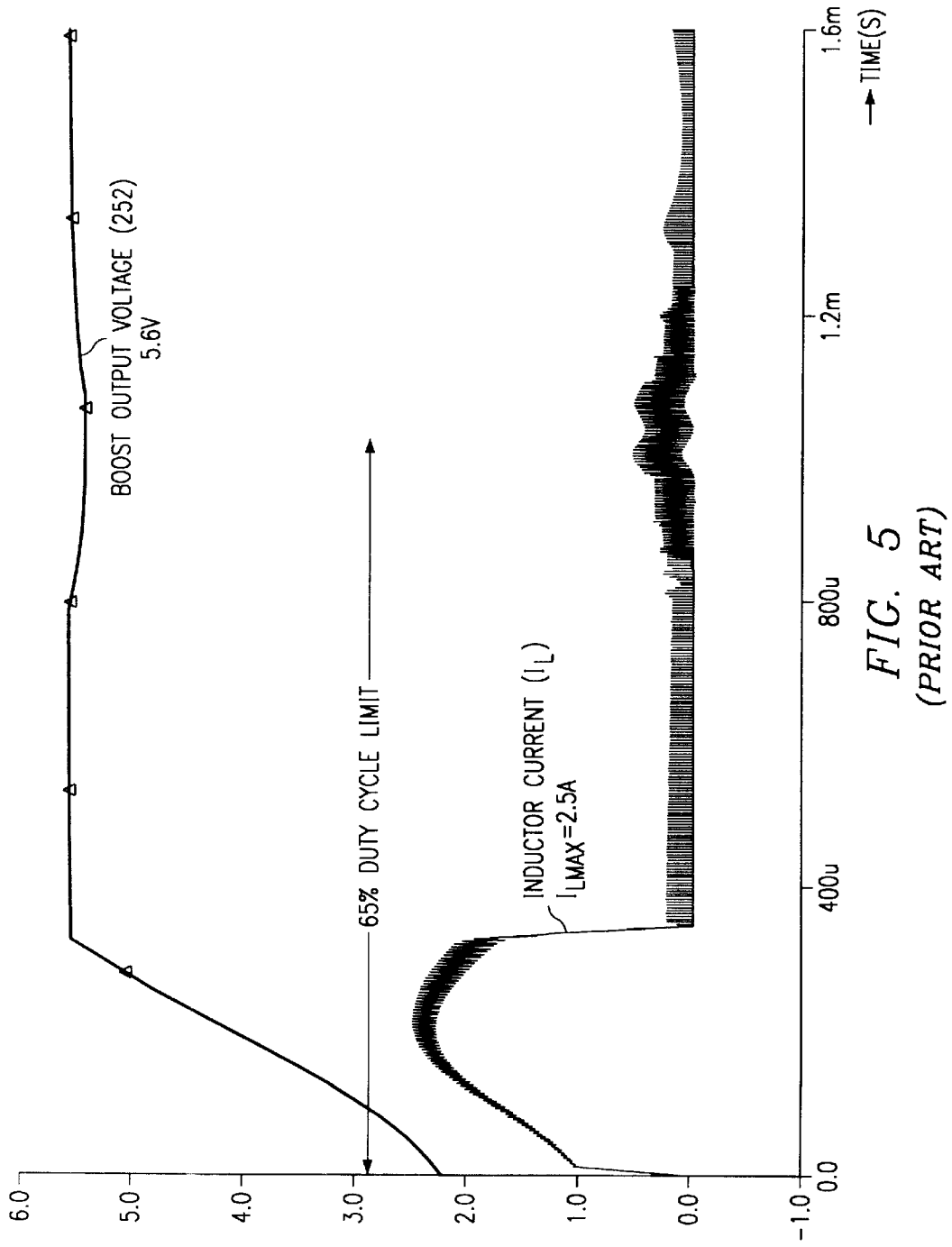
FIG. 5 graphically illustrates an example of the voltage and current characteristics of a conventional DC/DC switching regulator.

FIG. 5 illustrates exemplary voltage and current characteristics associated with simulation performance of a conventional DC/DC switching regulator. The input voltage is 2.5V and the load current is 0 mA at startup. The boost output voltage and the discrete inductor current IL are illustrated. The inductor current is a figure of merit relating to the start of the switching regulator. In this example, the peak inductor current ($I_{LMAX}$) is about 2.5 A. The boost regulator naturally passes the input to the output minus a diode drop, which explains the approximately 2.2V on the output at startup. Note that FIG. 5 also indicates that the performance illustrated is obtained using the conventional arrangement where the devices 231 and 324 (see also FIG. 1) are permitted to operate at a 65% duty cycle limit immediately upon startup.

Figure 6:
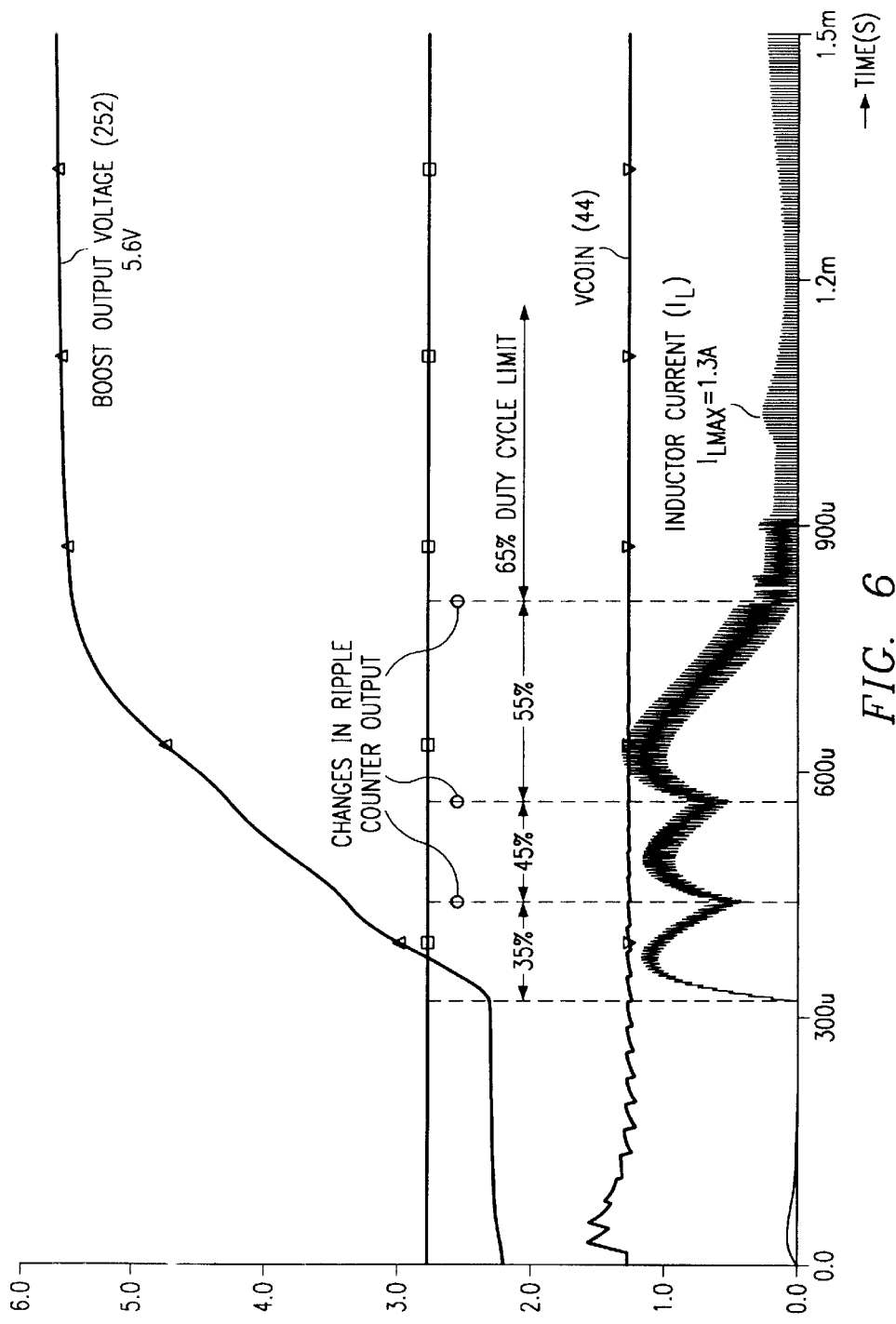
FIG. 6 graphically illustrates an example of the voltage and current characteristics of a DC/DC switching regulator such as illustrated in FIGS. 1–4.

FIG. 6 illustrates exemplary voltage and current characteristics associated with simulation performance of a DC/DC switching regulator according to the invention, for example the arrangement illustrated in FIGS. 1–4. Again, the input voltage is 2.5V and the load current is 0 mA at startup. In this example, the peak inductor current $I_{LMAX}$ is measured at 1.3 A, roughly half of that measured in the prior art example of FIG. 5. FIG. 6 illustrates the operation of the ripple counter, which controls the gradual increase of the duty cycle limit of the devices 231 and 324 from 35% to 45% to 55% to 65% percent of VREF. In particular, when the signal 712 activates transistor 420, the voltage at 300 (which is initially 35% of VREF with all resistors in the chain of FIG. 4) becomes 45% of VREF, when the signal 713 activates transistor 421, the voltage at 300 becomes 55% of VREF, and when the signal 714 activates transistor 422, the voltage at 300 becomes 65% of VREF. FIG. 6 also illustrates the tune voltage VCOIN 44 of FIGS. 1 and 2.

Figure 7:
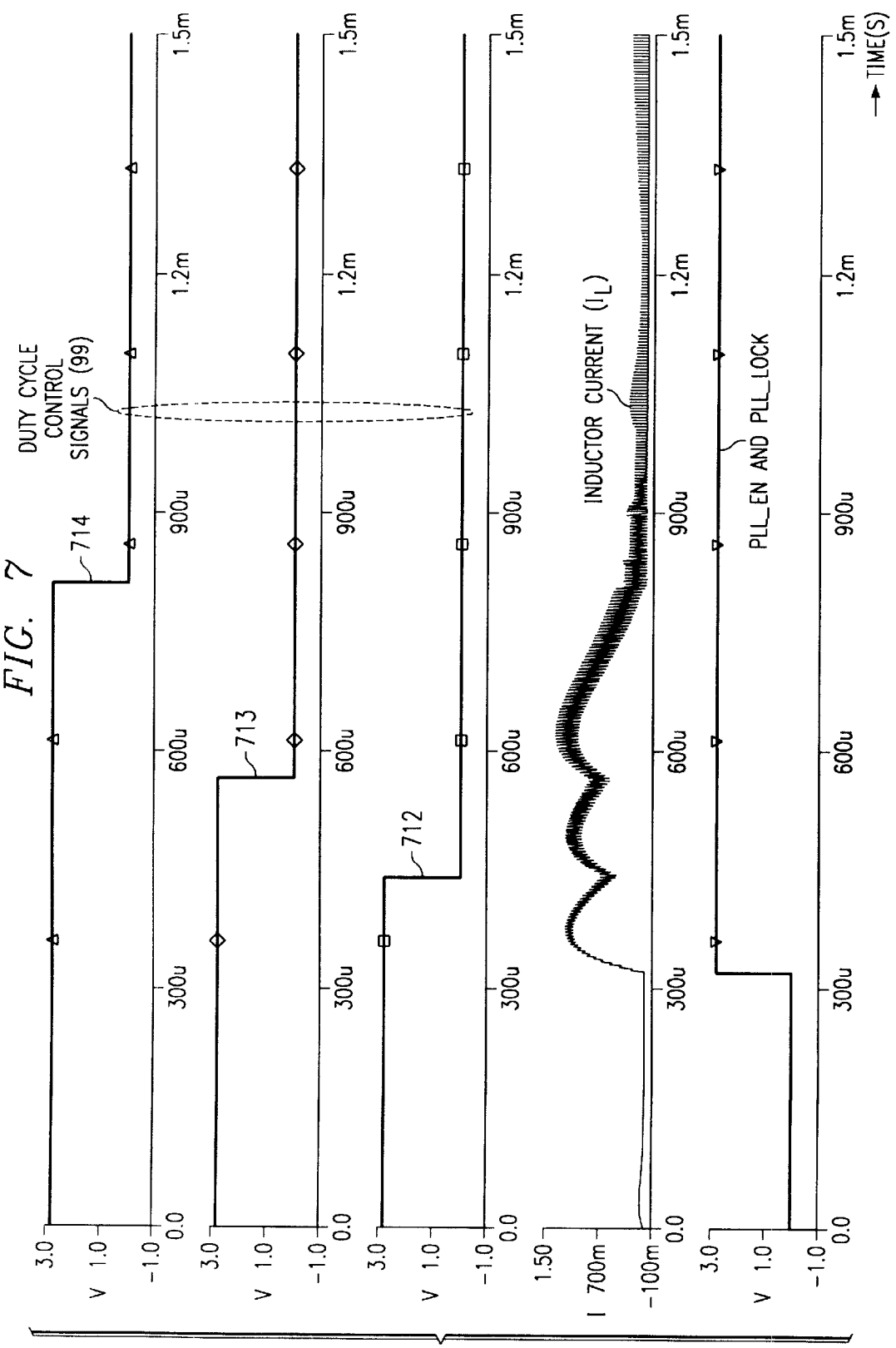
FIG. 7 graphically illustrates timing relationships between the current characteristic of FIG. 6 and selected timing signals.

FIG. 7 illustrates the load current of FIG. 6 and its timing relationship to the signals 712, 713 and 714, and PLL_EN and PLL_LOCK, of FIGS. 2–4.

It will be evident to workers in the art that the above-described soft-start control according to the invention provides the following exemplary advantages: fully integrated soft-start protection, with no external pins or components required; smaller die area requirements than prior art solutions, with no internal charging capacitors; no additional DC quiescent current required; inductor in-rush currents are limited, which reduces battery demands at startup; internal components are protected, for example, bondwire opening, metal electromigration, etc.; assistance in control of regulator startup overshoot; easily customizable for different power train/input-output voltage requirements; and easily programmable for different duty cycle limit settings.

Although exemplary embodiments of the invention are described above in detail, this does not limit the scope of the invention, which can be practiced in a variety of embodiments.

What is claimed is:

1. An apparatus for controlling startup operation of a DC/DC switching regulator, comprising:
   circuitry for producing a first signal whose waveform has a duty cycle that varies over time;
   an input for receiving a second signal indicative of a load condition of the regulator;
   a combiner coupled to said circuitry and said input for combining said first and second signals to produce a third signal; and
   an output for providing said third signal to control a power switch of the regulator.

2. The apparatus of claim 1, wherein said circuitry includes a ramp generator for generating a ramp signal, and a comparator having a first input coupled to said ramp generator for receiving said ramp signal and having a second input for receiving a voltage reference.

3. The apparatus of claim 2, wherein said comparator includes an output for providing said first signal.

4. The apparatus of claim 2, wherein said first comparator input is an inverting input and said second comparator input is a non-inverting input.

5. The apparatus of claim 2, wherein said circuitry includes a digital-to-analog converter having an output coupled to said second comparator input for providing said voltage reference.

6. The apparatus of claim 5, wherein said digital-to-analog converter includes a plurality of series-connected resistors and a plurality of bypass transistors respectively connected in parallel with said resistors.

7. The apparatus of claim 5, wherein said digital-to-analog converter includes an input for receiving a digital signal, and said circuitry including a counter coupled to said digital-to-analog converter input for providing said digital signal.

8. The apparatus of claim 7, wherein said counter is a ripple counter.

9. The apparatus of claim 7, wherein said counter includes a clock input coupled to receive said first signal.

10. The apparatus of claim 7, wherein said counter includes a plurality of interconnected D flip-flops.

11. The apparatus of claim 7, wherein said digital-to-analog converter is operable for increasing said voltage reference over time in response to said digital signal.

12. The apparatus of claim 11, wherein said comparator is responsive to said increasing voltage reference and said ramp signal for increasing said duty cycle of said first signal over time.

13. The apparatus of claim 7, wherein said counter includes an enable input for receiving a fourth signal which indicates when a timing reference clock of the regulator is operating at a stable frequency.

14. The apparatus of claim 1, wherein said duty cycle of said first signal increases over time.

15. The apparatus of claim 14, wherein said duty cycle of said first signal increases incrementally over time from a value greater than 0% sequentially through a plurality of values less than 100%.

16. The apparatus of claim 15, wherein said duty cycle increases from 35% to 45% to 55% to 65%.

17. The apparatus of claim 1, wherein said combiner includes a logic circuit.

18. The apparatus of claim 17, wherein said logic circuit includes one of an AND gate and a NAND gate.

19. A DC/DC switching regulator apparatus, comprising:
a power switch having a control input;
circuitry for producing a first signal whose waveform has a duty cycle that varies over time;
an input for receiving a second signal indicative of a load condition of said apparatus; and
a combiner coupled to said circuitry and said input for combining said first and second signals to produce a third signal, said combiner coupled to said control input for providing said third signal to said control input.

20. The apparatus of claim 19, wherein said circuitry includes a ramp generator for generating a ramp signal, and a comparator having a first input coupled to said ramp generator for receiving said ramp signal, a second input for receiving a voltage reference, and an output for providing said first signal.

21. The apparatus of claim 20, wherein said circuitry includes a digital-to-analog converter having an output coupled to said second comparator input for providing said voltage reference, said digital-to-analog converter having an input for receiving a digital signal, and said circuitry including a counter coupled to said digital-to-analog converter input for providing said digital signal.

22. The apparatus of claim 21, wherein said digital-to-analog converter is operable for increasing said voltage reference over time in response to said digital signal.

23. The apparatus of claim 22, wherein said comparator is responsive to said increasing voltage reference and said ramp signal for increasing said duty cycle of said first signal over time.

24. The apparatus of claim 21, wherein said counter includes an enable input for receiving a fourth signal which indicates when a timing reference clock of the regulator is operating at a stable frequency.

25. The apparatus of claim 21, wherein said counter includes a clock input coupled to said comparator output for receiving said first signal.

26. The apparatus of claim 21, wherein said counter is a ripple counter.

27. The apparatus of claim 19, wherein said duty cycle of said first signal increases over time.

28. The apparatus of claim 27, wherein said duty cycle of said first signal increases incrementally over time from a value greater than 0% sequentially through a plurality of values less than 100%.

29. The apparatus of claim 28, wherein said duty cycle increases from 35% to 45% to 55% to 65%.

30. A method of controlling startup operation of a DC/DC switching regulator, comprising:
providing a first signal whose waveform has a duty cycle that varies over time;
providing a second signal indicative of a load voltage of the regulator;
combining the first and second signals to produce a third signal; and
using the third signal to control a power switch of the regulator.

* * * * *